Aug. 21, 1956   J. J. BARUCH   2,759,556
ACOUSTIC METHOD AND SYSTEM
Filed Aug. 4, 1952   4 Sheets-Sheet 1

*INVENTOR.*
JORDAN J. BARUCH
BY *Rines and Rines*
ATTORNEYS

Aug. 21, 1956  J. J. BARUCH  2,759,556
ACOUSTIC METHOD AND SYSTEM
Filed Aug. 4, 1952  4 Sheets-Sheet 2

INVENTOR.
JORDAN J. BARUCH
BY *Rines and Rines*
ATTORNEYS

Aug. 21, 1956        J. J. BARUCH        2,759,556
ACOUSTIC METHOD AND SYSTEM
Filed Aug. 4, 1952        4 Sheets-Sheet 3
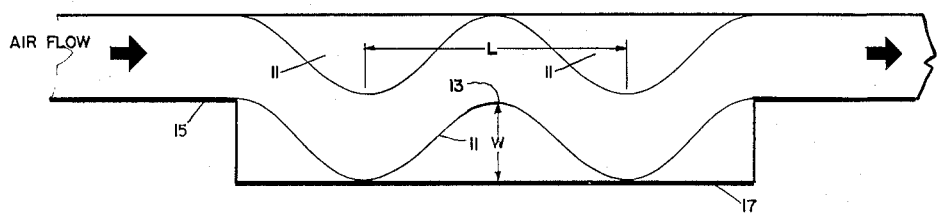
FIG. 5
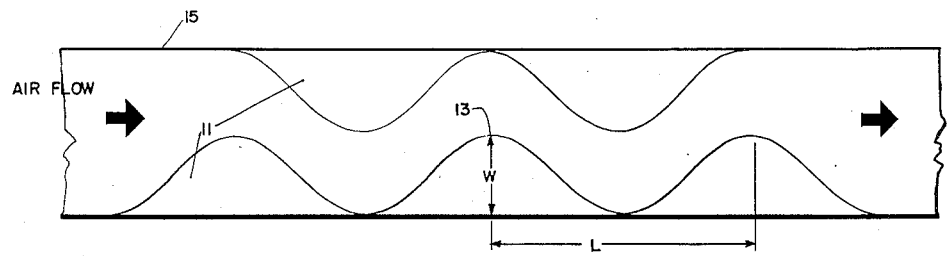
FIG. 6
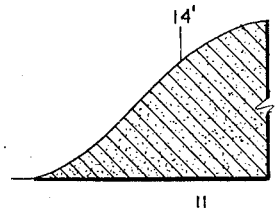    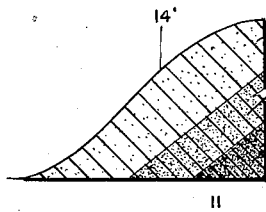    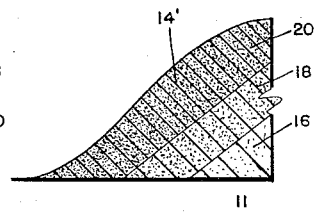
FIG. 7        FIG. 8        FIG. 9
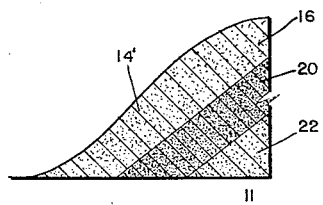    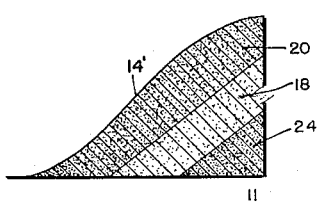
FIG. 10        FIG. 11
*INVENTOR.*
JORDAN J. BARUCH
BY *Rines and Rines*
ATTORNEYS

United States Patent Office 2,759,556
Patented Aug. 21, 1956

2,759,556

ACOUSTIC METHOD AND SYSTEM

Jordan J. Baruch, Cambridge, Mass., assignor, by mesne assignments, to Bolt, Beranek and Newman Inc., Cambridge, Mass., a corporation of Massachusetts Application August 4, 1952, Serial No. 302,544

25 Claims. (Cl. 181—50)

The present invention relates to acoustic methods and systems, and more particularly to methods of and systems for reducing the intensity of sound energy accompanying the flow of a fluid medium within a confined space.

In my copending application, Serial No. 300,113, filed July 21, 1952, for Acoustic Method and System, there are set forth the problems attendant upon reducing the intensity of sound energy of a band of frequencies accompanying the flow of a fluid medium, such as air, in a confined space, such as an aerodynamic test chamber, or the like. The invention disclosed in my said copending application relates to a method of and system for effecting such reduction with apparatus that is not subject to the many difficulties of prior-art apparatus, such as unwieldly dimensions, high construction costs, impeding of air flow, causing turbulence in air flow, and other disadvantageous effects.

An object of the present invention is to provide an alternative approach to that described in my said copending application for solving the sound-intensity reduction problem above mentioned, and for doing so with greater attenuation of the higher audio sound frequencies, greater control over the degree of attenuation of the intermediate audio sound frequencies, and greater control over the attenuation of the low audio sound frequencies as well.

Other and further objects will be explained hereinafter and will be more particularly pointed out in the appended claims.

In summary, the present invention relates to a new and improved method of and system for causing a fluid medium, such as air, containing sound energy of a band of frequencies, to travel along a zig-zag path, absorbing the intermediate sound frequencies of the said band of frequencies along the boundaries of the said zig-zag path, and fixing the position and the dimensions of the crests of the zig-zag path substantially in accordance with the half-wavelength of the intermediate sound frequencies of the said band of frequencies in order to resonate the said intermediate frequencies between the said crests and within the boundaries thereof, respectively, thereby further to attenuate the said intermediate frequencies. Preferred constructional details are hereinafter fully described.

The invention will now more fully be explained in connection with the accompanying drawings, Fig. 1 of which is a plan view of a test chamber embodying the present invention in preferred form, the roof of the chamber being removed;

Figs. 5 and 6 are plan views of mufflers or other air passages constructed in accordance with the present invention; and Figs. 7 through 11 are fragmentary cross-sectional views of a portion of the structure illustrated in Figs. 1, 2, 5 and 6.

Figure 1:
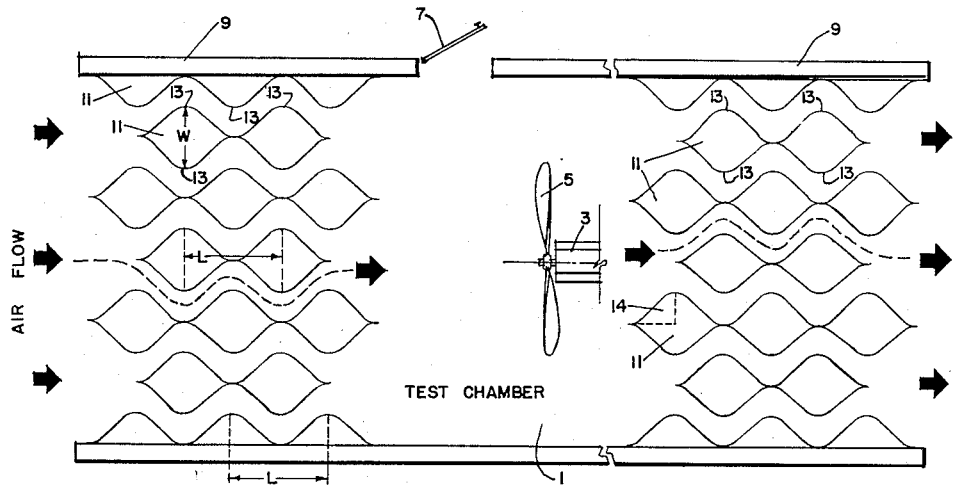

Referring to Fig. 1, a test chamber 1 is shown centrally provided with an engine 3 for driving a propeller 5, for test purposes, mounted upon the floor of the chamber in the customary manner. A door 7 in a side wall of the test chamber 1 may be provided to permit access to the test chamber. At each end of the test chamber, is disposed a terminal section 9 provided with a plurality of longitudinally extending sound-absorbing devices 11, shaped to provide a plurality of zig-zag paths between adjacent devices, the paths being spaced transversely within the terminal sections 9. Each of the longitudinally extending sound-absorbing devices 11 is of gradually periodically varying transverse dimension, disposed with the largest transverse dimension 13, substantially opposite to the smallest dimension or valley of the device or devices 11 adjacent thereto. The smooth continuously curved contour of the devices 11 causes the zig-zag-path boundaries to present stream-lined paths for the flow of air from the left-hand end of the test chamber through the left-hand terminal section 9, the central testing space and the right-hand terminal section 9, in the direction of the arrows. The sound-absorbing devices 11 may be formed of, for example, fibre glass, rock-wool, packed felt, or may be any other desired sound-absorbing construction that can be fabricated into the desired shape.

Figure 3:
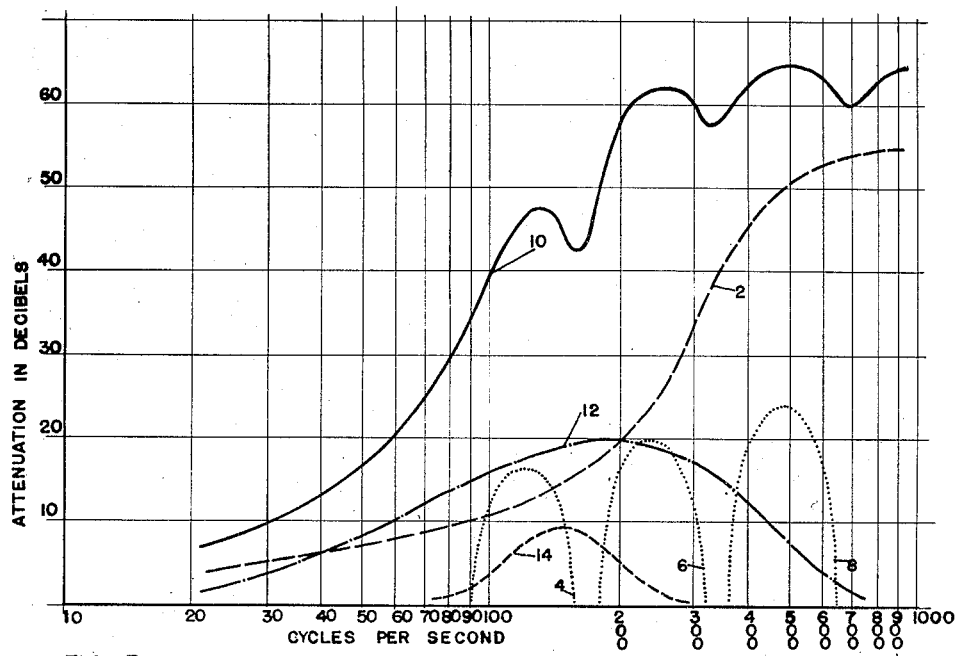
Figs. 3, 4 and 12 are graphs illustrating the performance of various systems constructed in accordance with the present invention.

Since the higher audio frequencies of the noise sounds generated by the engine 3 and/or propeller 5 tend to travel in straight lines, the zig-zag paths that the sound is required to travel between the adjacent sound absorbing devices 11, causes attenuation of these higher audio frequencies. The dash-line curve 2 of Fig. 3 represents the variation of attenuation, produced by the effect of these zig-zag paths, with frequency of the sound energy accompanying the flow of air, attenuation being plotted as the ordinate in units of decibels, and the frequency, as the abscissa, in cycles per second. From this curve 2 it is clear that substantial attenuation, in excess of 50 decibels, is effected at the higher frequencies, say above about 600 cycles per second. Inasmuch as the gradually periodically varying smooth walls of the sound-absorbing devices 11 of the present invention define the zig-zag paths, some of the lower intermediate frequencies, say from about 100 to about 300 cycles per second, are also partially absorbed by the absorbent walls. The dash-line curve 14 of Fig. 3 shows the degree of partial attenuation of the intermediate frequencies effected by the walls of the devices 11 alone, such partial absorption being of the order of about 4 decibels at 100 cycles, 9 decibels at 150 cycles, and 5 decibels at 200 cycles.

The intermediate frequencies are further attenuated in accordance with the present invention by proper adjustment of the longitudinal dimension L. By spacing the successive zig-zag-path crests 13, namely the successive direction-changing points of the zig-zag paths, to correspond substantially to the half-wavelength of these intermediate sound frequencies, such further attenuation can be achieved. In actual practice, an average wavelength of the band of intermediate frequencies from about 100 to about 500 cycles may be employed. The use of such periodic spacing of the successive direction-changing points or crests 13 defining the boundaries of the zig-zag paths of itself produces the plurality of peaked attenuation characteristics shown in the three dotted curves 4, 6 and 8 of Fig. 3. This periodic or tuned structure, in effect, causes resonance, actually multiple resonances 4, 6 and 8, of the intermediate sound frequencies in the space between successive crests 13, thereby effecting further attenuation by the acoustically absorbent material of the devices 11. The operation may be more easily understood by considering that the sound energy travels horizontally through the sound-absorbing devices 11 as well as along the air paths between such devices. Since the largest constriction or baffle, and hence the largest impedance, to the flow of the sound energy is presented at the points 13 of maximum transverse dimension of each sound-absorbing device 11, and since these successive points 13 are spaced longitudinally at the resonant half-wavelength spacings, these added longitudinal resonance-absorption effects occur. In the tests plotted in Fig. 3, these multiple resonance characteristics are produced by this structure in the neighborhood of about 130 cycles, about 250 cycles and about 500 cycles.

Still a further control over the degree of attenuation of the intermediate frequencies, however, is also provided by the present invention. The transverse dimension or width W of the devices 11 at the crests 13, Fig. 1, is also made to correspond to the half-wavelength of the intermediate frequencies thus producing, also, resonance absorption transversely within the devices 11 that form the walls or boundaries of the zig-zag paths. The baffle crests 13 of the devices 11 adjacent the walls 9 of the test chamber will, of course, be tuned to a width corresponding to W/2, or half the said half-wavelength. The attenuation characteristics produced by such transverse resonance absorption is plotted in the dash-dot curve 12 of Fig. 3, providing, for example, an additional 20 decibels of attenuation at about 200 cycles. This additional attenuation results from the fact that, at the transverse half-wavelength resonant dimension W, Fig. 1, the material of the sound-absorber at the crests 13 presents a low impedance looking transversely inward at the crests 13 comparable with the impedance presented along the zig-zag path. The sound energy, therefore, divides, an appreciable part traveling transversely into the absorber at the crests 13, and part continuing along the zig-zag path. The appreciable part of the sound energy that, because of the low impedance presented transversely inward by the resonant dimension W, divides at the crests 13 and travels transversely into the crests 13, dissipates itself within the same, producing the additional transverse-resonance absorption phenomenon 12.

The resultant effect of the before-mentioned zig-zag path attenuation 2, the wall absorption 14, the longitudinal periodic spacing attenuation 4, 6, 8 and the transverse-tuning resonance absorption 12 within the portions 13 of the devices 11, is plotted as the solid-line curve 10 of Fig. 3. It will be observed that the intermediate frequencies from about 100 to about 500 cycles are appreciably attenuated with from about 40 to about 65 decibels of attenuation, that the high frequencies of the band above about 600 cycles are attenuated with in excess of 60 decibels of attenuation, and that even the low frequencies below 100 cycles, say from 60 cycles to 95 cycles, are reasonably attenuated with from about 20 to about 37 decibels of attenuation. This attenuation, moreover, is accomplished with stream-lined air flow.

The results presented in Fig. 3 were obtained with a device 11 having a non-uniform density of sound-absorbing material. A cross-section of a quarter-portion 14' of this device 11 is shown upon an enlarged scale in Fig. 11 comprising an intermediate absorbing material section 20 of greater density than the density of the section 16 adjacent the walls of the device 11 and the similar density of the central section 22 of the device 11. The absorbent material sections may be in the form of contiguous strips, as shown. As an illustration of a typical installation for producing results similar to those shown in Fig. 3, the transverse spacing between the sound-absorbing devices may be from about 1 to about 4 feet, half of the transverse dimension W of each device, Fig. 1, may be from about 1 to about 4 feet and the longitudinal separation L between alternate crests of the zig-zag paths may be from about 6 to about 10 feet, depending upon the characteristics desired.

Figure 4:
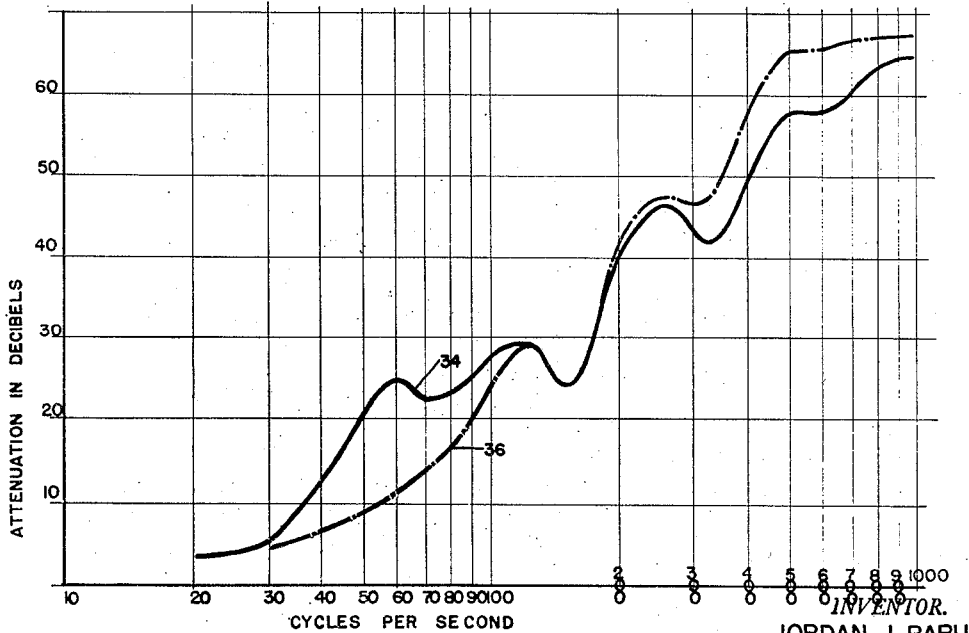

In accordance with an additional feature of the invention, a further control over the attenuation characteristics is provided by varying the density of the absorbent material comprising the devices 11. With a device 11 of uniform density, as shown in Fig. 7, a resultant attenuation characteristic of the character represented by the curve 36 of Fig. 4 is obtained. This resultant characteristic 36 differs from the resultant characteristic 10 of Fig. 3 in providing considerably less attenuation of the low frequencies below 100 cycles, somewhat less attenuation of the intermediate frequencies from about 100 to about 400 cycles, and somewhat greater and more uniform attenuation of the high frequencies above about 600 cycles.

If, on the other hand, it is desired to reduce somewhat the high-frequency attenuation of curve 36 and to increase, instead, the low frequency attenuation, maintaining the intermediate frequency attenuation about the same, as shown in curve 34, Fig. 4, a density variation of the character illustrated in Fig. 9 may be employed. This construction embodies the most dense section 20 adjacent the wall of the device 11, and an intermediate section 18 and central section 16 of decreasing density.

Figure 12:
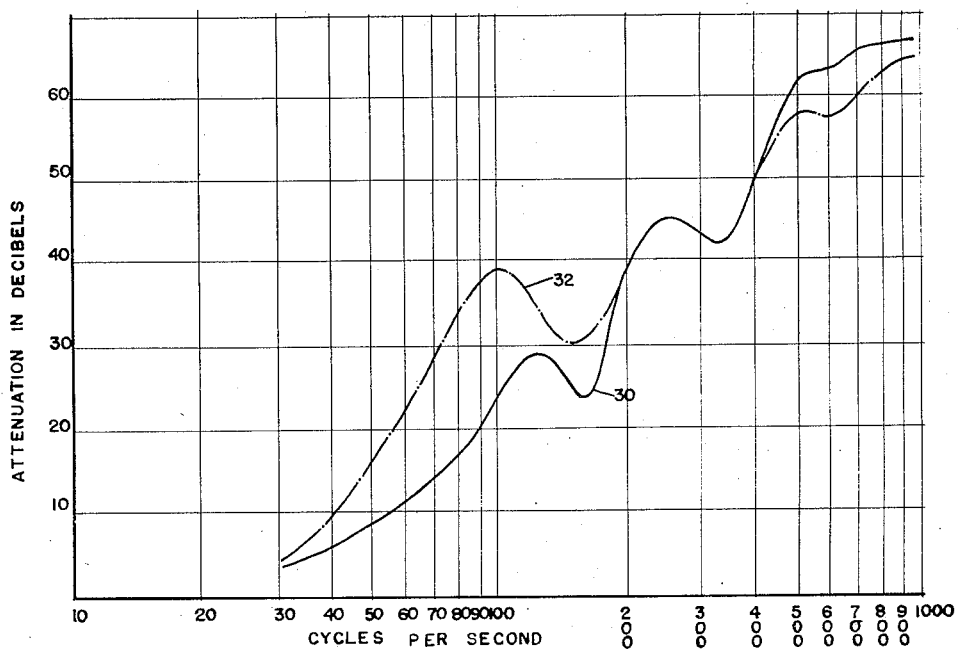

As another illustration, should it be desired to maintain characteristics similar to those represented by the curve 34, Fig. 4, but to reduce the degree of attenuation of the low frequencies below about 100 cycles, as illustrated by the curve 30 of Fig. 12, a density distribution of the character shown in Fig. 8 may be used. In Fig. 8, the least dense section 16 is disposed adjacent the wall of the device 11, and the intermediate section 18 and the central section 20 are of successively increasing density. If, on the contrary, the characteristics of curve 34 are desired with increased low-frequency attenuation and somewhat increased high-frequency attenuation as well, as represented by the curve 32, Fig. 12, the construction of Fig. 11 may be utilized having an intermediate section 18 of less density than similar outer and inner sections 20 and 24.

Figure 2:
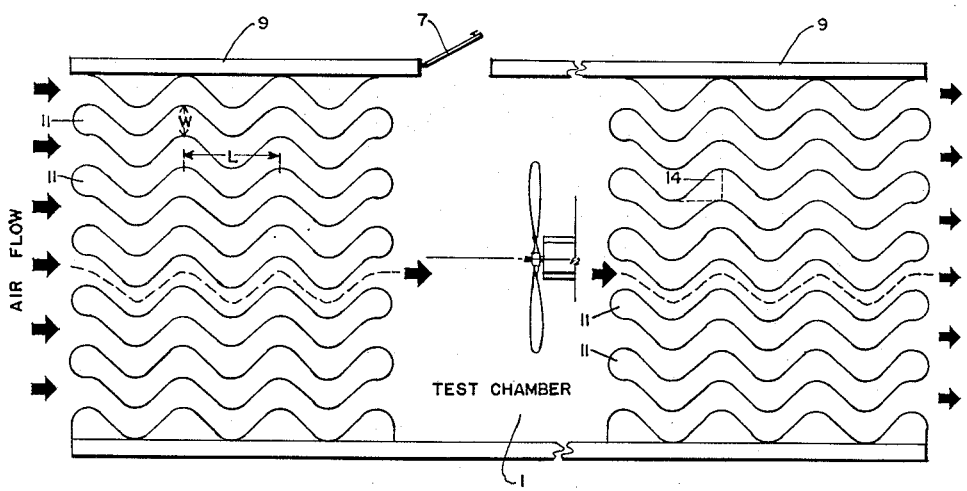
Fig. 2 is a similar view of a modification.

It may be not necessary that the adjacent zig-zag paths defined by the absorbent devices 11 of the present invention successively diverge and converge from and toward one another, as shown in Fig. 1. The paths may be parallel as shown in Fig. 2. In accordance with the present invention, however, the spacing L and transverse dimension W in Fig. 2, the latter being one-half of that of the transverse dimension W of Fig. 1, will be tuned or adjusted to be resonant to the said intermediate sound frequencies to produce the results before described. The devices 11 of Fig. 2 may also, of course, have any of the density distributions of Figs. 7 to 11.

The techniques of the present invention may, of course, be applied also to other applications than aerodynamic test chambers. In Figs. 5 and 6, for example, mufflers for automobiles or conduits in air-conditioning systems and the like, are shown at 15, provided with sound absorbing devices 11 of the character before described. The before-mentioned spacing L between alternate crests may again be adjusted, as may the maximum transverse dimension W, corresponding to the same dimension in Fig. 2, in order to produce the before-described resonance-absorption results. In the system of Fig. 5, the sound absorbing devices 11 are shown provided in a section 17 of greater dimensions than the muffler or other conduit 15. Such a section may, for example, be applied to existing mufflers or other conduits that are too small to accommodate absorbent devices 11 of the necessary dimensions. In Fig. 6, on the other hand, the conduit 15 is of sufficient size to accommodate the sound-absorbing devices 11 without need for a supplemental section 17.

In all cases, the sound absorbing devices 11 may extend from the bottom of the conduit or chamber to the top, or between side walls thereof, and may be easily installed in separate or continuous sections. While the smooth gradually increasing and decreasing curves of the zig-zag path are shown of substantially sinusoidal form in the drawings, other preferably symmetrical smooth contours may be employed. It is also to be understood that if the additional attenuation provided by the tuned transverse dimension L is not desired, then the dimension L need not be made resonant to the particular intermediate frequencies. In the event, moreover, that it is desired to shift the attenuation characteristics to a different frequency band, either higher than shown in Figs. 3, 4 and 12, or lower, as when the before-described variations in density of the sound-absorbing material will not produce sufficiently great attenuation changes in the desired resultant characteristic, it is merely necessary to readjust dimensions L and W to correspond to the desired different frequency. The present invention, moreover, is adapted to scaling or proportionate reduction or increase in the dimensions of the structure in order to cover any desired band of frequencies with attenuation responses of the character shown in Figs. 3, 4 and 12.

Further modifications will occur to those skilled in the art and all such are considered to fall within the spirit and scope of the invention as defined in the appended claims.

What is claimed is:

1. A method of the character described that comprises causing air containing sound energy of a band of frequencies to travel within a confined space, partially absorbing the intermediate frequencies of the said band of frequencies along the walls of the space, resonating the intermediate frequencies longitudinally and transversely within the said walls further to attenuate the same, causing the air to travel along a zig-zag path, and absorbing the high sound frequencies of the said band of frequencies along the boundaries of the said zig-zag path.

2. A method of the character described that comprises causing air containing sound energy of a band of frequencies to travel longitudinally within a confined space, partially absorbing the intermediate frequencies of the said band of frequencies along the walls of the space, reducing the impedance transversely inward of the walls at predetermined points thereof, resonating the intermediate frequencies transversely within the said walls at the said predetermined points further to attenuate the same, causing the air to travel along a zig-zag path, and absorbing the high sound frequencies of the said band of frequencies along the boundaries of the said zig-zag path.

3. A method of the character described that comprises causing air containing sound energy of a band of frequencies to travel within a confined space, partially absorbing the intermediate frequencies of the said band of frequencies along the walls of the space, resonating the intermediate frequencies transversely within the said walls further to attenuate the same, causing the air to travel along a zig-zag path, and absorbing the high sound frequencies of the said band of frequencies along the boundaries of the said zig-zag path.

4. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices spaced transversely within the confined space and shaped to provide a zig-zag path or paths therebetween, whereby the high sound frequencies and part of the intermediate frequencies of the said band of frequencies become attenuated by absorption in the said devices along the boundaries of the zig-zag path or paths, each device having a transverse dimension tuned with respect to the said intermediate sound frequencies of the said band of frequencies and the longitudinal separation between successive crests of the zig-zag path or paths being fixed substantially in accordance with the half-wavelength of the said intermediate frequencies in order further to attenuate the said intermediate frequencies.

5. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices spaced transversely within the confined space and shaped to provide a smooth-curve zig-zag path or paths there-between, whereby the high sound frequencies and part of the intermediate frequencies of the said band of frequencies become attenuated by absorption in the said devices along the boundaries of the zig-zag path or paths while the medium flow is stream-lined therealong, each device having a transverse dimension corresponding substantially to the half-wavelength of the said intermediate sound frequencies of the said band of frequencies and the longitudinal separation between successive crests of the zig-zag path or paths being fixed substantially in accordance with the said half-wavelength in order further to attenuate the said intermediate frequencies.

6. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices each of periodically and gradually varying transverse dimension space transversely within the confined space with the largest transverse dimension of each device disposed substantially opposite to the smallest transverse dimension of the device or devices adjacent thereto, whereby the high sound frequencies and part of the intermediate frequencies of the said band of frequencies become attenuated by absorption in the said devices along the boundaries of the resulting zig-zag path or paths, the largest transverse dimensions of each device and the separation between the largest transverse dimensions of adjacent devices corresponding substantially to the half-wavelength of the said intermediate sound frequencies of the said band of frequencies in order further to attenuate the said intermediate frequencies.

7. In an acoustic system in which air is adapted to flow longitudinally through a confined space, means for reducing the intensity of sound energy of a band of frequencies accompanying the flow of the air comprising a plurality of longitudinally extending sound-absorbing devices each of periodically and gradually varying transverse dimension spaced transversely within the confined space with the largest transverse dimension of each device disposed substantially opposite to the smallest transverse dimension of the device or devices adjacent thereto, whereby the high sound frequencies and part of the intermediate frequencies of the said band of frequencies become attenuated by absorption in the said devices along the boundaries of the resulting zig-zag path or paths, the largest transverse dimension of each device and the separation between the largest transverse dimensions of adjacent devices being tuned with respect to the said intermediate sound frequencies of the said band of frequencies in order further to attenuate the said intermediate frequencies.

8. In an acoustic system in which air is adapted to flow longitudinally through a confined space, means for reducing the intensity of sound energy of a band of frequencies accompanying the flow of the air comprising a plurality of longitudinally extending sound-absorbing devices each of periodically and gradually varying transverse dimension spaced transversely within the confined space with the largest transverse dimension of each device disposed substantially opposite to the smallest transverse dimension of the device or devices adjacent thereto, whereby the high sound frequencies and part of the intermediate frequencies of the said band of frequencies become attenuated by absorption in the said devices along the boundaries of the resulting zig-zag path or paths, the said transverse-dimension variation being along smooth continuous curves, thereby to stream-line the flow of air, and the largest transverse dimensions of each device and the separation between the largest transverse dimensions of adjacent devices being tuned with respect to the said intermediate sound frequencies of the said band of frequencies in order further to attenuate the said intermediate frequencies.

9. In an acoustic system in which air is adapted to flow longitudinally through a confined space, means for reducing the intensity of sound energy of a band of frequencies accompanying the flow of the air comprising a plurality of longitudinally extending sound-absorbing devices each of periodically and gradually varying transverse dimension spaced transversely within the confined space with the largest transverse dimension of each device disposed substantially opposite to the smallest transverse dimension of the device or devices adjacent thereto, whereby the high sound frequencies and part of the intermediate frequencies of the said band of frequencies become attenuated by absorption in the said devices along the boundaries of the resulting zig-zag path or paths, the said transverse-dimension variation being along smooth continuous curves, thereby to stream-line the flow of air, and the largest transverse dimensions of each device corresponding substantially to the half-wavelength of the said intermediate sound frequencies of the said band of frequencies in order further to attenuate the said intermediate frequencies.

10. In an acoustic system in which air is adapted to flow longitudinally through a confined space, means for reducing the intensity of sound energy of a band of frequencies accompanying the flow of the air comprising a plurality of longitudinally extending sound-absorbing devices each of periodically and gradually varying transverse dimension spaced transversely within the confined space with the largest transverse dimension of each device disposed substantially opposite to the smallest transverse dimension of the device or devices adjacent thereto, whereby the high sound frequencies and part of the intermediate frequencies of the said band of frequencies become attenuated by absorption in the said devices along boundaries of the resulting zig-zag path or paths, the said transverse-dimension variation being along smooth continuous curves, thereby to stream-line the flow of air, and the largest transverse dimensions of each device being tuned with respect to the said intermediate sound frequencies of the said band of frequencies in order further to attenuate the said intermediate frequencies.

11. In an acoustic system in which air is adapted to flow longitudinally through a confined space, means for reducing the intensity of sound energy of a band of frequencies accompanying the flow of the air comprising a plurality of substantially parallel longitudinally extending sound-absorbing devices spaced transversely within the confined space and shaped to provide a plurality of substantially parallel zig-zag paths there-between, whereby the high sound frequencies and part of the intermediate frequencies of the said band of frequencies become attenuated by absorption in the said devices along the boundaries of the zig-zag paths, each device having a transverse dimension tuned with respect to the said intermediate sound frequencies of the said band of frequencies and the longitudinal separation between successive crests of the zig-zag paths being fixed substantially in accordance with the half-wavelength of the said intermediate sound frequencies in order further to attenuate the said intermediate frequencies.

12. In an aerodynamic test chamber in which air is adapted to flow longitudinally through the chamber in response to the rotation of a propeller and the like within the chamber, means disposed at each end of the test chamber for reducing the intensity of sound energy of a band of frequencies generated by the rotation of the propeller and the like and accompanying the flow of air comprising a plurality of longitudinally extending sound-absorbing devices spaced transversely within the ends of the test chamber and shaped to provide zig-zag paths there-between, whereby the high sound frequencies and part of the intermediate frequencies of the said band of frequencies become attenuated by absorption in the said devices along the boundaries of the zig-zag paths, each device having a transverse dimension corresponding substantially to the half-wavelength of the said intermediate sound frequencies of the said band of frequencies and the longitudinal separation between successive crests of the zig-zag paths being fixed substantially in accordance with the said half-wavelength in order further to attenuate the said intermediate frequencies.

13. Apparatus as claimed in claim 4 and in which the said sound-absorbing devices comprise sound-absorbing material of substantially uniform density.

14. Apparatus as claimed in claim 4 and in which the sound-absorbing devices comprise sound-absorbing material of successively increasing density from the walls of the devices inward thereof.

15. Apparatus as claimed in claim 4 and in which the sound-absorbing devices comprise sound-absorbing material of successively decreasing density from the walls of the devices inward thereof.

16. Apparatus as claimed in claim 4 and in which the sound-absorbing devices comprise sound-absorbing material the density of which increases and then decreases from the walls of the devices inward thereof.

17. Apparatus as claimed in claim 4 and in which the sound-absorbing devices comprise sound-absorbing material the density of which decreases and then increases from the walls of the devices inward thereof.

18. Apparatus as claimed in claim 4 and in which the transverse spacing between the said longitudinally extending sound-absorbing devices is from about 1 to about 4 feet, the said transverse dimension of each device is from about 1 to about 4 feet and the separation at which the said crests of the zig-zag path or paths is fixed is from about 6 to about 10 feet.

19. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices spaced transversely within the confined space and shaped to provide a zig-zag path or paths therebetween, whereby the high sound frequencies and part of the intermediate frequencies of the said band of frequencies become attenuated by absorption in the said devices along the boundaries of the zig-zag path or paths, each device having a transverse dimension tuned with respect to the half-wavelength of the said intermediate sound frequencies of the said band of frequencies in order further to attenuate the said intermediate frequencies.

20. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices spaced transversely within the confined space and shaped to provide a zig-zag path or paths therebetween, whereby the high sound frequencies and part of the intermediate frequencies of the said band of frequencies become attenuated by absorption in the said devices along the boundaries of the zig-zag path or paths, each device having a transverse dimension corresponding substantially to the half-wavelength of the said intermediate sound frequencies of the said band of frequencies in order further to attenuate the said intermediate frequencies.

21. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices spaced transversely within the confined space and shaped to provide a zig-zag path or paths there-between, whereby the high sound frequencies and part of the intermediate frequencies of the said band of frequencies become attenuated by absorption in the said devices along the boundaries of the zig-zag path or paths, each device having a transverse dimension corresponding substantially to half the half-wavelength of the said intermediate sound frequencies of the said band of frequencies in order further to attenuate the said intermediate frequencies.

22. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices spaced transversely within the confined space and shaped to provide a zig-zag path or paths there-between, whereby the high sound frequencies and part of the intermediate frequencies of the said band of frequencies become attenuated by absorption in the said devices along the boundaries of the zig-zag path or paths, each device having a transverse dimension corresponding substantially to half the half-wavelength of the said intermediate sound frequencies of the said band of frequencies, and the successive direction-changing points of the zig-zag path or paths being fixed substantially in accordance with the said half-wavelength in order further to attenuate the said intermediate frequencies.

23. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices spaced transversely within the confined space and shaped to force the high and part of the intermediate sound frequencies of the said band of frequencies to travel in a zig-zag path or paths there-between, whereby the high sound frequencies and part of the intermediate frequencies of the said band of frequencies become attenuated by absorption in the said devices along the boundaries during such travel, and means for providing a low impedance to the flow of the sound energy transversely inward of the zig-zag path or paths at predetermined intervals spaced longitudinally therealong in order further to attenuate the intermediate sound frequencies.

24. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices spaced transversely within the confined space and shaped to force the high and part of the intermediate sound frequencies of the said band of frequencies to travel in a zig-zag path or paths there-between, whereby the high sound frequencies and part of the intermediate frequencies of the said band of frequencies become attenuated by absorption in the said devices along the boundaries during such travel, the transverse dimension of the sound-absorbing devices at the successive direction-changing points of the zig-zag path or paths being tuned with respect to the intermediate sound frequencies to provide a low impedance to the flow of the sound energy transversely inward of the zig-zag path or paths at the said points in order further to attenuate the intermediate sound frequencies.

25. In an acoustic system in which a fluid medium is adapted to flow longitudinally through a confined space, means for reducing the intensity of sound energy of a band of frequencies accompanying the flow of the medium comprising a plurality of longitudinally extending sound-absorbing devices spaced transversely within the confined space and shaped to force the high and part of the intermediate sound frequencies to travel in a zig-zag path or paths there-between, whereby the high sound frequencies and part of the intermediate frequencies of the said band of frequencies become attenuated by absorption in the said devices along the boundaries during such travel, the transverse dimension of the sound-absorbing devices at the successive direction-changing points of the zig-zag path or paths being tuned with respect to the intermediate sound frequencies to provide a low impedance to the flow of the sound energy transversely inward of the zig-zag path or paths at the said points, and the said points being spaced longitudinally a distance corresponding substantially to the half-wavelength of the intermediate sound frequencies in order to provide a high impedance to the longitudinal flow of the sound energy at intervals spaced longitudinally a distance corresponding to the said half-wavelength, thereby further to attenuate the said intermediate frequencies.

References Cited in the file of this patent

UNITED STATES PATENTS

| | | |
|---|---|---|
| 1,658,402 | Warth | Feb. 7, 1928 |
| 1,998,386 | Powell | Apr. 16, 1935 |
| 2,270,825 | Parkinson et al. | Jan. 20, 1942 |
| 2,519,161 | Tucker | Aug. 15, 1950 |

FOREIGN PATENTS

| | | |
|---|---|---|
| 285,604 | Great Britain | Feb. 23, 1928 |
| 746,961 | France | June 9, 1933 |